J. W. GOLDEN.
FENCE POST.
APPLICATION FILED SEPT. 1, 1911.
1,022,314.
Patented Apr. 2, 1912.
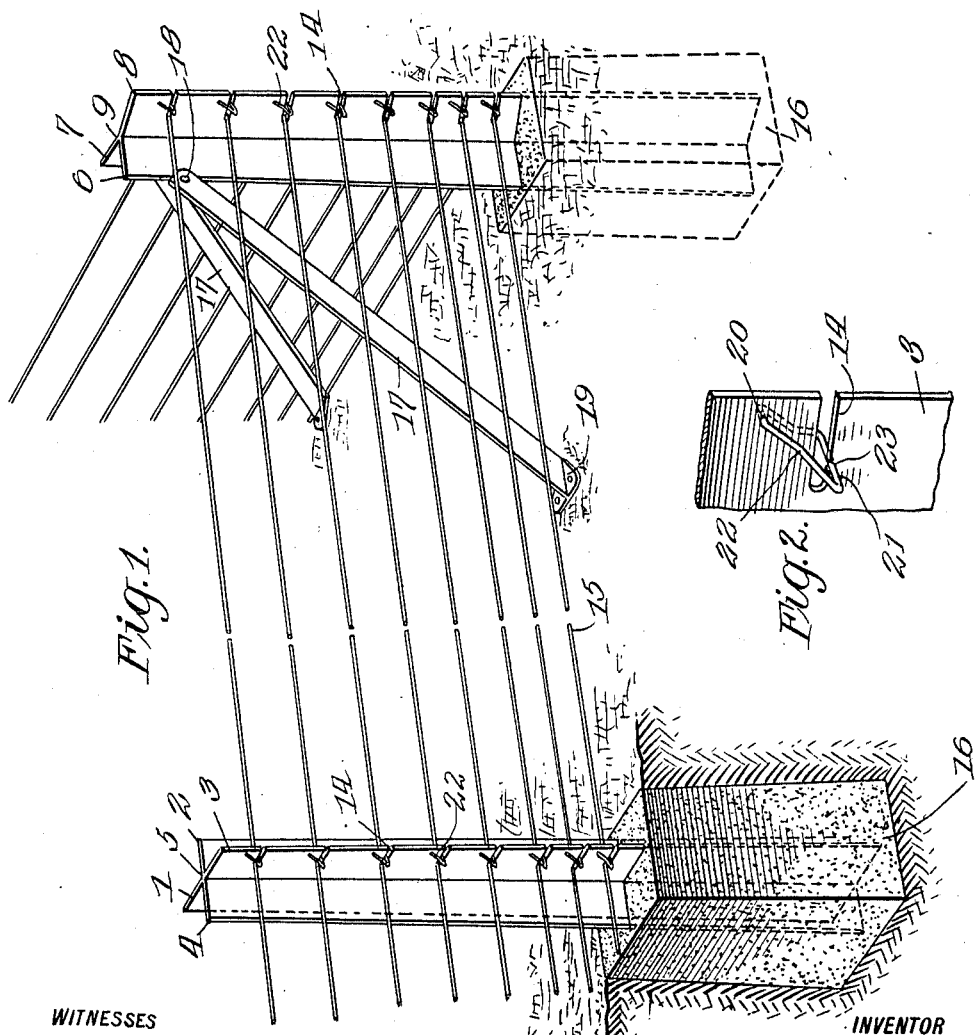
WITNESSES
Samuel E. Wade.
C. E. Traunor
INVENTOR
JAMES W. GOLDEN.
BY
ATTORNEYS

UNITED STATES PATENT OFFICE.

JAMES WALTER GOLDEN, OF HODGES, MONTANA.

FENCE-POST.

1,022,314.　　　　Specification of Letters Patent.　　Patented Apr. 2, 1912.

Application filed September 1, 1911. Serial No. 647,168.

*To all whom it may concern:*

Be it known that I, JAMES WALTER GOLDEN, a citizen of the United States, and a resident of Hodges, in the county of Dawson and State of Montana, have invented a new and Improved Fence-Post, of which the following is a full, clear, and exact description.

My invention is an improvement in fence posts, and has for its object the provision of a simple, inexpensive post of the character specified, especially designed for wire fencing, and having means for detachably holding each wire in place, and wherein a bracing means is provided for the corner posts.

In the drawings:—Figure 1 is a perspective view of a fence provided with the improved post; and Fig. 2 is a perspective view of a post.

The posts may be composed of four wings, 1, 2, 3 and 4 connected at one edge, as indicated at 5 in Fig. 1, and diverging from each other at equal angles, as shown at the left of the said figure, or the said posts may consist of three wings, 6, 7 and 8, connected at one edge at 9, as indicated at the right of the said figure. The latter form is especially designed for corner posts, and the wings diverge from each other at angles of 120°. In either form, one wing is provided with spaced notches 14, for receiving the wires 15, of which the fence is composed. The said notches are arranged at intervals corresponding to the position of the wires, and are closer together toward the bottom of the post than at the top. The lower end of the wing is free from notches, and the post is embedded in a block 16 of plastic material, as for instance concrete. The block 16 is embedded in the ground, with the top thereof flush with the surface of the ground. The blocks may be formed in the opening of the ground, the said opening acting as a mold for the block.

The corner posts are preferably braced by bars 17, each of which has one end bolted or riveted to a wing, as indicated at 18, and the other end is provided with a foot 19 which rests upon and is secured at the surface of the ground in any suitable manner. The said braces are of course arranged to support the post in two directions against the pull of the wires, and the third wing is arranged to split the angle equally, so that the wires in both directions are carried by the braced wings.

The wires 15 are held in the notches 14, by means of the holders shown in Fig. 2. The said holders comprise each a loop, the ends 20 and 21 of which are parallel, but the latter is of greater length than the former. The side members 22 of the loops are offset to connect with both ends. A recess 23 is provided in the lower side of each notch 14, and the bar 21 of the loop is received in the said recess, while the other bar 20 is pivoted in an opening 24 in the wing, above the notch. The notch is of sufficient depth to permit the loop to be swung out of the recess, and of sufficient width to permit the wires 15 to pass the loop and enter the rear end of the notch, after which the loop is swung down to lock the wire 15 in the notch. The wires 15 may be detachably held at their ends in any suitable manner and by loosening the loop, any wire may be detached from any or all of the posts.

I claim:—

1. A fence post provided with a plurality of spaced substantially horizontal notches in its free edge for receiving the fence wires, each notch having a recess in its lower side adjacent to the inner edge of the notch, and a loop for each notch, the post having an opening above each notch for receiving the loop, the said opening being disposed laterally with respect to the recess and on the outer side thereof to constrain the loop to take an inclined position when engaged with the recess.

2. A fence post having a wing provided with a plurality of spaced substantially horizontal notches in its free edge for receiving the fence wires, each notch having a recess in its lower side, and a loop pivoted to the wing above each notch and resting in the recess.

JAMES WALTER GOLDEN.

Witnesses:
J. P. SCHAEFFER,
WM. J. PLACHSENHAR.

---

Copies of this patent may be obtained for five cents each, by addressing the "Commissioner of Patents, Washington, D. C."